Oct. 15, 1968 A. W. PETERSEN 3,405,689
APPARATUS FOR BOILING LIQUIDS BY FALLING FILM HEATING
Filed May 29, 1967

INVENTOR.
ALFRED W. PETERSEN
BY Edwin H. Baker
ATTORNEY 3,405,689
APPARATUS FOR BOILING LIQUIDS BY
FALLING FILM HEATING
Alfred W. Petersen, Salt Lake City, Utah, assignor to Stauffer Chemical Company, New York, N.Y., a corporation of Delaware
Filed May 29, 1967, Ser. No. 642,109
4 Claims. (Cl. 122—39)

ABSTRACT OF THE DISCLOSURE

An improved falling film evaporator for boiling a liquid having a plurality of substantially vertically disposed tubular passageways, a liquid distributor means connected to said tubular passageways at the entrance ends thereof, means for heating the tubular passageways, a separation chamber situated in open connection with the exit ends of the tubular passageways, the improvement being a plate having a plurality of holes which is mounted in the separation chamber below the exit ends of the tubular passageways. The surface area of the plate is selected so that the liquid falling down the tubular passageways does not boil but will sub-cool boil and a portion of the liquid that has passed through the holes of the plate into the separation chamber boils.

---

This invention relates to the boiling of liquids in evaporators where the liquid is recirculated. More specifically, this invention relates to the boiling of liquids in a falling film evaporator which is modified to increase the heat transfer coefficient in the tubes.

Two common commercial evaporators, where the liquid is recirculated, are the forced circulation and falling film types.

Forced circulation evaporators have the liquid pumped through the tubes in the heat exchanger. The tubes run full of liquid. Boiling normally does not occur in the tubes, but rather in a chamber to which the tubes discharge.

One advantage of a forced circulation evaporator is the high heat transfer coefficient obtained in the tubes. The high coefficient results from fluid turbulence at the high tube velocity attainable with a circulating pump. Another advantage is the relative freedom from scaling or fouling. This results in part from the absence of boiling in the tubes. The formation of vapor bubbles during a process of boiling is usually accompanied by the deposition of scale from materials dissolved in the boiling liquid.

A disadvantage of a forced circulation evaporator is the high power requirement for the circulating of a large volume of liquid through the tubes. Another disadvantage is the relatively high retention time of the liquid requirement. Undesirable decomposition of liquids or precipitation of solids where encountered, would occur to a greater extent at higher retention times.

Falling film evaporators have the liquid pumped to the entrance ends of a plurality of vertically disposed tubular passageways such as tubes. The liquid runs down the walls of the tubes in a falling film and the tubes are not full of liquid. Boiling occurs on the tube walls.

One advantage of a falling film evaporator is the low power requirement for the recirculating pump. Less recirculating liquid is required, because the tubes do not run full. Another advantage is the low retention time allowed for the liquid.

The falling film evaporator overcomes some of the disadvantages of the forced circulation evaporator. But the falling film unit has some of its own disadvantages. One is that the heat transfer coefficient is lower than for forced circulation. Another disadvantage is that the boiling on the tube walls probably tends to scale more than forced circulation, where there is normally no boiling in the tubes.

It is the purpose of this invention to modify a falling film evaporator to increase the heat transfer coefficient and decrease the tendency to scale.

It is also a purpose of this invention to retain the advantages of a falling film evaporator, yet lessen the disadvantages with respect to a forced circulation evaporator.

The aforementioned purposes are achieved by the addition of a flow restriction means, such as a baffle plate containing holes, below the said tubular pasasgeways, such as tubes, of a falling film evaporator. The holes in the baffle plate cause a pressure drop across the plate due to the flow constriction. The higher pressure in the tubes above the plate suppresses normal boiling, because the vapor pressure of the liquid is less than the total pressure in the tubes. There is no net evolution of vapor in the tubes due to boiling, because the average liquid temperature is below the boiling point (subcooled liquid). However, some local boiling on the tube wall does occur on the hot tube surface, where the temperature is above the liquid boiling point. The bubbles that form on the wall become disengaged, but collapse completely soon thereafter in the subcooled liquid away from the tube wall. This type of bubble formation and collapse is called subcooled boiling. Considerable turbulence is caused by the growth and collapse of bubbles near the wall. The heat transfer coefficient greatly increases as a result of the turbulence caused by subcooled boiling. The purpose of the baffle plate with holes is to produce subcooled boiling. A higher heat transfer coefficient results. There's probably less scale formation because there is no net boiling.

The maximum hole area in the baffle plate is determined by the minimum pressure differential required to prevent net boiling in the tubes. As the liquid flows down the tubes, the liquid temperature rises above the boiling temperature that would have been obtained without the baffle plate. The total pressure above the baffle plate must be at least high enough to stop boiling at the maximum liquid temperature to be expected in the tubes. The required total pressure above the baffle may be obtained from vapor pressure vs. temperature data for the liquid being heated. The minimum pressure differential across the plate is the difference between the total pressure above and below the plate. The maximum hole area is calculated from the minimum pressure differential and the expected volumetric recirculation flow rate, with the approximation that 1.5 velocity heads of pressure are lost as the liquid flows through the holes in the plate. The above criteria for the maximum area are incorporated in the equation for calculating the maximum hole area.

$$A = \frac{Q}{4460}\sqrt{\frac{S}{\Delta P}} \text{ square feet}$$

Equation 1 where
$Q$=recirculation rate of liquid, gallons/minute
$S$=liquid specific gravity
$\Delta P$=minimum pressure differential across plate to prevent net boiling, pounds/square inch.

The minimum hole area in the baffle plate is determined by the maximum total pressure at which subcooled boiling can occur. When the total pressure above the baffle plate is sufficiently high that the tube wall temperature does not exceed the boiling temperature of the liquid, no type of boiling can occur. The maximum total pressure would vary widely with the type of fluid and other conditions and is difficult to predict in the general case. It is a characteristic of subcooled boiling that the closer the total pressure is to the minimum, the greater is the heat transfer coefficient. Therefore, the total pressure should be as low as possible, and the corresponding hole area should be as large as possible but less than the calculated maximum hole area.

A convenient, practical size of holes is at least as large as the inside of the tubes, such that a foreign object passing through the tubes will not lodge in the baffle plate holes. But the invention is not limited to said size, as any size or shape of holes will accomplish the purpose of the invention, providing the total hole area is correct. The holes are preferably uniformly distributed over the plate, although the invention will work with nonuniform distribution also. The plate should be at least one-half tube diameter below the tubes in order to allow free flow of the liquid. There is no maximum to the distance below the tubes. It is preferable that the baffle plate be between one and ten tube diameters below the tubes.

The invention is applicable whether the total pressure in the evaporator is superatmospheric, atmospheric or subatmospheric. The invention applies to all liquids that can be boiled such as water, acids, bases, organic liquids, inorganic solutions and mixtures thereof, but is not restricted thereto.

The invention will be more completely described by reference to the drawings.

Figures 1, 2:
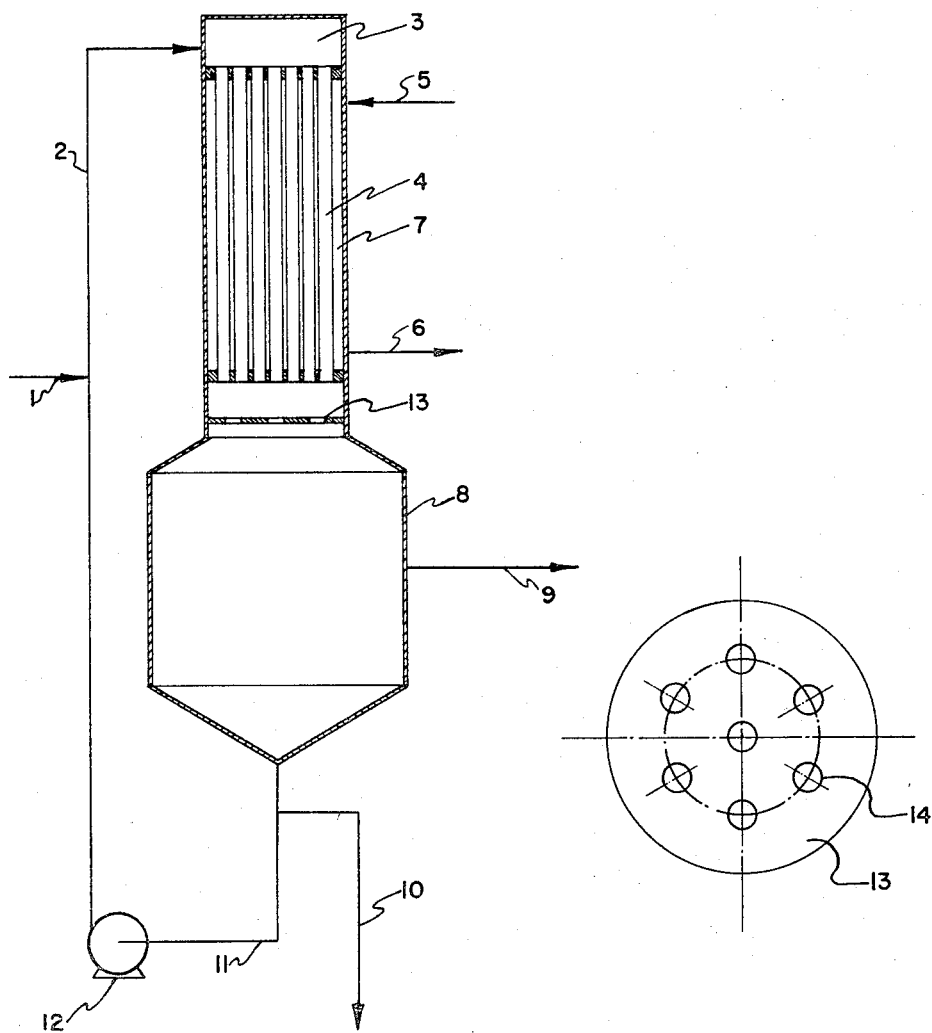
FIGURE 1 shows a typical, conventional falling film evaporator with the baffle plate added.
FIGURE 2 shows a typical baffle plate with holes.

Referring now to FIGURE 1, a typical, conventional falling film evaporator without baffle plate 13 will first be described. The feed liquid enters in a pipe 1, combining with recirculated liquid in pipe 2. The combined liquids enter a liquid distributor means such as a distributor chamber 3 and run down the walls of the vertical tubes 4. The tubes can be heated by various heating means. For example, a heating fluid or vapor enters pipe 5 into the space 7 around the tubes and heats the falling liquid film on the inside of the tubes. The cooled or condensed heating fluid or vapor exits space 7 through pipe 6. The falling liquid evolves vapor from boiling as it is heated, and a combination of liquid and vapors exit the tubes into a separation chamber 8. The vapor boiled off separates from the liquid and exits through pipe 9. The liquid runs down pipe 11 to the recirculation pump 12 for another pass through the heating system. Product liquid is removed through pipe 10.

When the baffle plate 13 is installed below the tubes, operation is as above except that there is no net evolution of vapor by boiling in the tubes. The back pressure from liquid flow through the holes in the baffle plate 13 stops net boiling above the baffle plate 13. Subcooled boiling, which is the formation and collapse of bubbles near the tube wall, still occurs. There is a net evolution of vapor by boiling only after the liquid has passed through the holes into the lower pressure region below the baffle plate. The sudden evolution of vapor as the liquid passes through the holes is called flashing. After the liquid flashes, the liquid and vapor are separated in the separation chamber 9 and subsequent steps are the same as in the conventional falling film evaporator.

Referring now to FIGURE 2 a typical baffle plate 13 is shown with circular holes 14. The following examples will illustrate the invention:

*Example 1*

A falling film evaporator containing 2¾-inch inside diameter tubes with 287 sq. ft. inside area was operated at a constant recirculation rate of 700 gallons/minute with high pressure steam as the heating vapor. Wet process phosphoric acid containing 52% $P_2O_5$ was fed into the recirculating stream containing 68% $P_2O_5$ at 1.9 specific gravity and at an absolute pressure of 0.8 pound/square inch. The heat transfer variables for a series of runs are recorded in Table 1. Runs 1–3 inclusive were taken without the baffle plate below the tubes and represent the performance of a conventional falling film evaporator. The acid-side heat transfer coefficient is low and nearly constant with respect to acid-side $\Delta t$. Runs 4–9 were taken with the baffle plate in position below the tubes and with other conditions nearly constant. The increase in the acid-side heat transfer coefficient is considerable. The heat transfer coefficient is higher at higher $\Delta t$, and this is a characteristic is subcooled boiling.

TABLE 1

| Run | Temperature, ° F. | | | Acid-Side $\Delta t$, ° F. | Steam Condensation Rate, B.t.u./hr. | Acid-Side Heat Transfer Coefficient, B.t.u./hr.-sq. ft.-° F. | Baffle Plate Used? |
|---|---|---|---|---|---|---|---|
| 1 | 415 | 410 | 381 | 29 | 800,000 | 96 | No. |
| 2 | 416 | 409 | 367 | 42 | 1,170,000 | 97 | No. |
| 3 | 415 | 403 | 347 | 56 | 1,600,000 | 99 | No. |
| 4 | 417 | 412 | 392 | 20 | 740,000 | 129 | Yes. |
| 5 | 417 | 409 | 382 | 27 | 1,150,000 | 149 | Yes. |
| 6 | 417 | 404 | 374 | 30 | 1,720,000 | 200 | Yes. |
| 7 | 417 | 402 | 368 | 34 | 2,010,000 | 206 | Yes. |
| 8 | 415 | 396 | 354 | 42 | 2,650,000 | 220 | Yes. |
| 9 | 415 | 392 | 344 | 48 | 3,140,000 | 228 | Yes. |

*Example 2*

For Run 9 of Example 1, the acid temperature would increase 11° F. in falling down the length of tubes where the acid has a 0.44 B.t.u./pound—° F. heat capacity. From vapor pressure data, the 11° F. increase corresponds to a vapor pressure differential across the plate must therefore be 0.17 pound/square inch. The maximum area of the holes for the baffle plate of Example 1 is calculated from Equation 1 to be 0.52 square foot. Actually used in the tests for Example 1 was 0.30 square foot of hole area arranged in 6 holes 3 inches diameter. The 3-inch diameter was chosen because it is slightly larger than the inside diameter of the tubes, and the possibility of plugging the holes is small. The actual pressure differential calculated for the plate was 0.54 pound/square inch, which is sufficient to suppress net boiling in the tubes.

I claim:

1. In a device for boiling a liquid having a plurality of substantially vertically disposed tubular passageways, liquid distributor means connected to said tubular passageways at the entrance ends thereof, means for heating said tubular passageways, a separation chamber situated in open connection with the exit ends of said tubular passageways, the improvement comprising a flow restriction means having a plurality of openings mounted within said separation chamber in spaced relationship with the exit ends of said tubular passageways, the surface area of said flow restriction means being sufficient to prevent boiling of said liquid in said tubular passageways without preventing subcooled boiling of said liquid in the tubular passageways and of sufficient surface area to permit flashing of said liquid in the space below said flow restriction means within said separation chamber.

2. The device of claim 1 in which said flow restriction means is a baffle plate.

3. The device of claim 2 in which said plurality of openings of said baffle plate are uniformly distributed.

4. The device of claim 2 in which said baffle plate is located at least one half tube diameter of said tubular passageways below said tubular passageway.

References Cited

UNITED STATES PATENTS 2,742,083 4/1956 Henszey.
3,175,962 3/1965 Holtslag.
3,356,125 12/1967 Standiford.

CHARLES J. MYHRE, *Primary Examiner.*